US006700744B2

(12) United States Patent
Nishida et al.

(10) Patent No.: US 6,700,744 B2
(45) Date of Patent: Mar. 2, 2004

(54) SUSPENSION FOR DISC DRIVE (75) Inventors: Tatsuhiko Nishida, Aiko-gun (JP);
Osamu Iriuchijima, Yokohama (JP);
Masao Hanya, Yokohama (JP);
Chihiro Kono, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 153 days.

(21) Appl. No.: 09/815,595

(22) Filed: Mar. 23, 2001

(65) Prior Publication Data

US 2002/0131211 A1 Sep. 19, 2002

(30) Foreign Application Priority Data

Mar. 19, 2001 (JP) .......................... 2001-079358

(51) Int. Cl.[7] .............................. G11B 21/16
(52) U.S. Cl. .................................. 360/244.2
(58) Field of Search .................. 360/244.1–244.9, 360/245.1–245.9

(56) References Cited

U.S. PATENT DOCUMENTS 4,991,045 A    2/1991  Oberg
5,689,389 A  * 11/1997  Braunheim
6,351,351 B1 *  2/2002  Takasugi ............... 360/245.9

FOREIGN PATENT DOCUMENTS

JP    60-127578    7/1985

OTHER PUBLICATIONS

M. Hanya et al, "Suspension Design for Windage and High Bandwidth", (Treatise), Presented on Mar. 27, 2000, Japan.

* cited by examiner

Primary Examiner—Allen Cao
(74) Attorney, Agent, or Firm—Frishauf, Holtz, Goodman & Chick, P.C.

(57) ABSTRACT

A suspension comprises a baseplate having a boss portion, a beam portion with a flexure, and a hinge member. The hinge member includes a connecting portion that can bend in the thickness direction thereof between the baseplate and the beam portion. If the length of the suspension from a pivot portion on the distal end portion of the beam portion to the center of the boss portion is 14.5 mm, the thickness of the baseplate is 0.175 mm or greater, the width of the baseplate is 4.5 mm or greater, the length of the connecting portion of the hinge member is 0.7 mm or shorter, and the length of the baseplate is 5.04 mm or shorter.

2 Claims, 6 Drawing Sheets

SUSPENSION FOR DISC DRIVE

CROSS-REFERENCE TO RELATED APPLICATIONS

This application is based upon and claims the benefit of priority from the prior Japanese Patent Application No. 2001-079358, filed Mar. 19, 2001, the entire contents of which are incorporated herein by reference.

BACKGROUND OF THE INVENTION

The present invention relates to a suspension for disc drive incorporated in an information processing apparatus, such as a personal computer.

A hard disc drive (HDD) for recording in and reading information from a rotating magnetic disc or magneto-optical disc includes a carriage that can turn around a shaft. The carriage is rotated around the shaft by means of a positioning motor. The carriage is provided with an arm (actuator arm), a suspension mounted on the distal end portion of the arm, a head portion including a slider mounted on the suspension, etc.

When the disc rotates, air that gets into the space between the slider and the surface of the disc causes the slider slightly to lift off the disc surface. This suspension comprises a baseplate fixed to a suspension mounting surface of the arm, a beam portion formed of a precision plate spring, a flexure fixed to the beam portion, etc.

With the advance of compaction of information recorded in the disc and speed-up of the disc drive operation, the disc drive of this type has been requiring a shorter seek time. In order to shorten the seek time, the rotation of the disc must be speeded up further. If the disc rotates at high speed, however, an air turbulence that is generated near the disc surface causes the suspension to flutter, thus arousing a serious problem.

BRIEF SUMMARY OF THE INVENTION

In order to improve various properties that are required of suspensions, a suspension has been developed by the inventors hereof such that a baseplate and a beam portion are connected to each other by means of a hinge member that is formed of a thin spring member. For example, a suspension 1 shown in FIG. 1 comprises a baseplate 2, beam portion 3, hinge member 4, etc. The baseplate 2 is formed having a boss portion 7 that can be fixed to an actuator arm 6. The hinge member 4 is provided with connecting portions 4a with a length L1 between the baseplate 2 and the beam portion 3. The connecting portions 4a are bendable in the thickness direction of the hinge member 4. The beam portion 3 is fitted with a flexure 8, which is provided with a slider 9.

Figure 2:
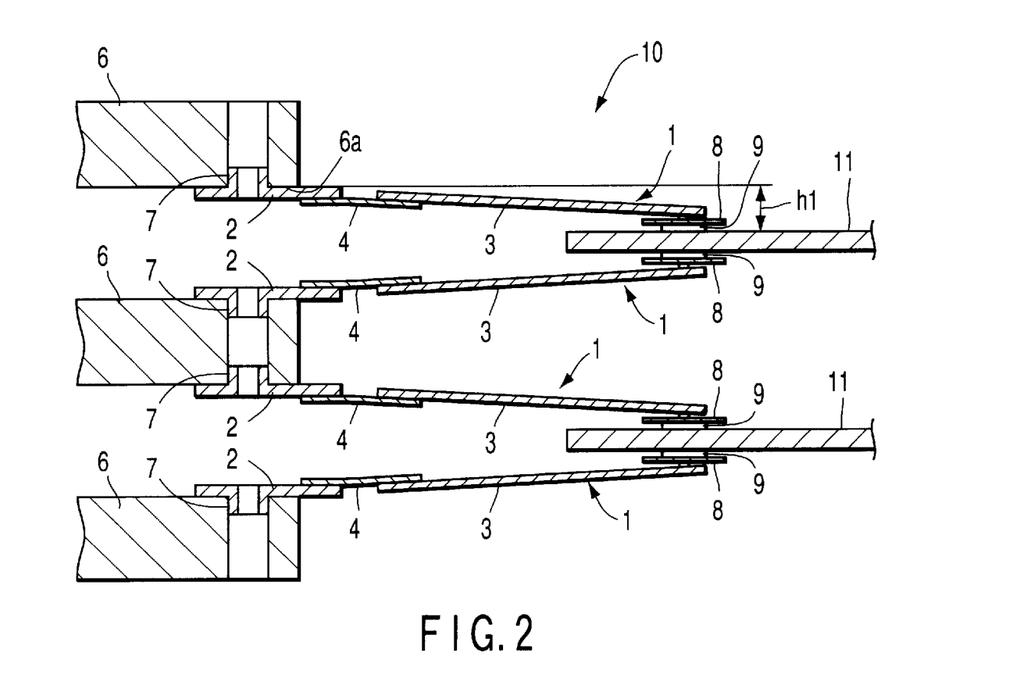
FIG. 2 is a sectional view of a part of a disc drive provided with the suspension shown in FIG. 1.

In a hard disc drive 10 shown in FIG. 2, each suspension 1 is mounted on the actuator arm 6. The actuator arm 6 is turned around a shaft (not shown) by means of a positioning motor (not shown). The slider 9 is opposed to a surface of a disc 11. In this specification, a distance h1 from the surface of the disc 11 to a baseplate mounting surface 6a of the actuator arm 6 is referred to as Z-height.

Figure 3:
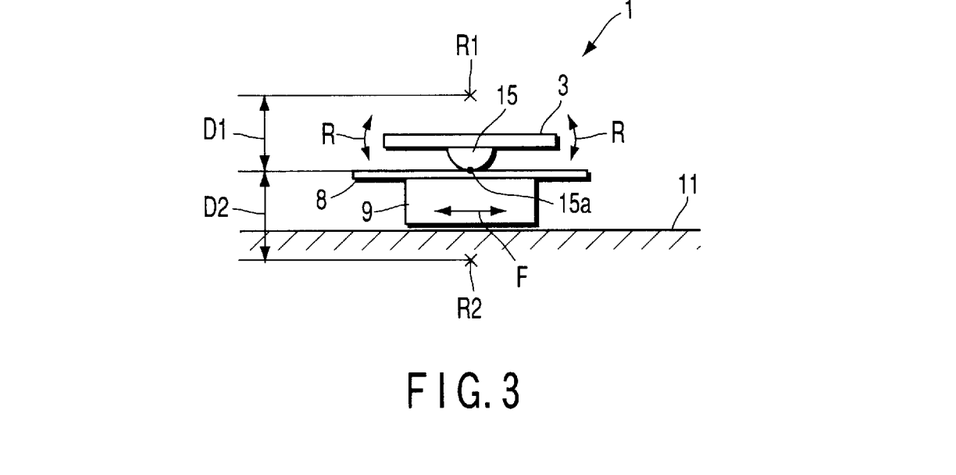
FIG. 3 is a front view of the distal end portion of the suspension shown in FIG. 1.

As shown in FIG. 3, a convex pivot portion 15 (dimple as it is called in the art) for supporting the slider 9 for rocking motion is formed on the distal end portion of the beam portion 3. The slider 9 on the flexure 8 is rockable around a distal end 15a of the pivot portion 15. Even if the suspension 1 flutters, the slider 9 never moves in the direction indicated by arrow F when the beam portion 3 swings around the distal end 15a of the pivot portion 15.

Owing to variation in the Z-height, however, the beam portion 3 may possibly swing around a spot (e.g., pivot center designated by R1 or R2 in FIG. 3) that is off the distal end 15a of the pivot portion 15. As the pivot portion 15 is displaced in the direction of arrow F, in this case, the slider 9 inevitably moves in the direction of arrow F, thereby causing a track miss.

Figure 1:
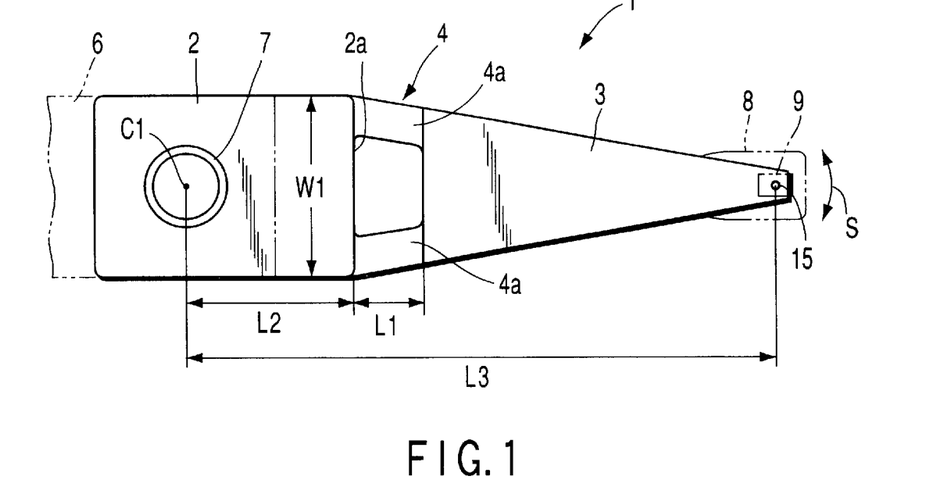
FIG. 1 is a plan view schematically showing a suspension for disc drive provided with a baseplate, beam portion, and hinge member.

As the rotation of the disc 11 is speeded up, according to the suspension 1 described above, it becomes more important to restrain fluttering. Essential factors to restrain fluttering include the thickness of the baseplate 2, a width W1 of the baseplate 2, a distance L2 (referred to as baseplate length herein) from a center C1 of the boss portion 7 to a front end 2a of the baseplate 2, etc., as well as the length L1 (referred to as hinge length herein) of the connecting portions 4a of the hinge member 4.

Fluttering is not a problem with a suspension of which a length L3 from the center C1 of the boss portion 7 to the pivot portion 15 is 11.0 mm, for example. Possibly, however, fluttering may interfere with the operation of a suspension that has the length L3 of 14.5 mm.

In some cases, fluttering can be effectively restrained by enhancing the torsion stiffness of the suspension 1. It may be supposed, therefore, that fluttering can be restrained by increasing the width W1 of the baseplate 2 from, e.g., 4 mm to 4.5 mm. According to a diligent study made by the inventors hereof, however, fluttering cannot be satisfactorily restrained by only increasing the width of the baseplate 2.

Accordingly, the object of the present invention is to provide a suspension capable of restraining generation of fluttering in a disc drive with a disc that rotates at high speed.

In order to achieve the above object, a suspension for disc drive according to the present invention comprises a baseplate having a boss portion, a beam portion with a flexure, and a hinge member fixed to the baseplate and the beam portion and including a connecting portion bendable in the thickness direction thereof between the baseplate and the beam portion, the thickness of the baseplate ranging from 0.175 mm to 0.25 mm, the width of the baseplate being greater than 4.0 mm and not greater than 5.0 mm, the length of the connecting portion of the hinge member ranging from 0.1 mm to 0.7 mm, and the baseplate length from the center of the boss portion to the front end of the baseplate ranging from 4.0 mm to 5.1 mm.

According to the suspension of this invention, generation of fluttering can be restrained even when the disc rotates at high speed, so that the disc rotation can be speeded up without hindrance. According to this invention, moreover, generation of fluttering can be restrained with a high-rotation disc in the suspension that has a length of 14.5 mm.

The following is a description of the reason why the dimensions according to present invention are restricted to aforementioned values.

Figure 4:
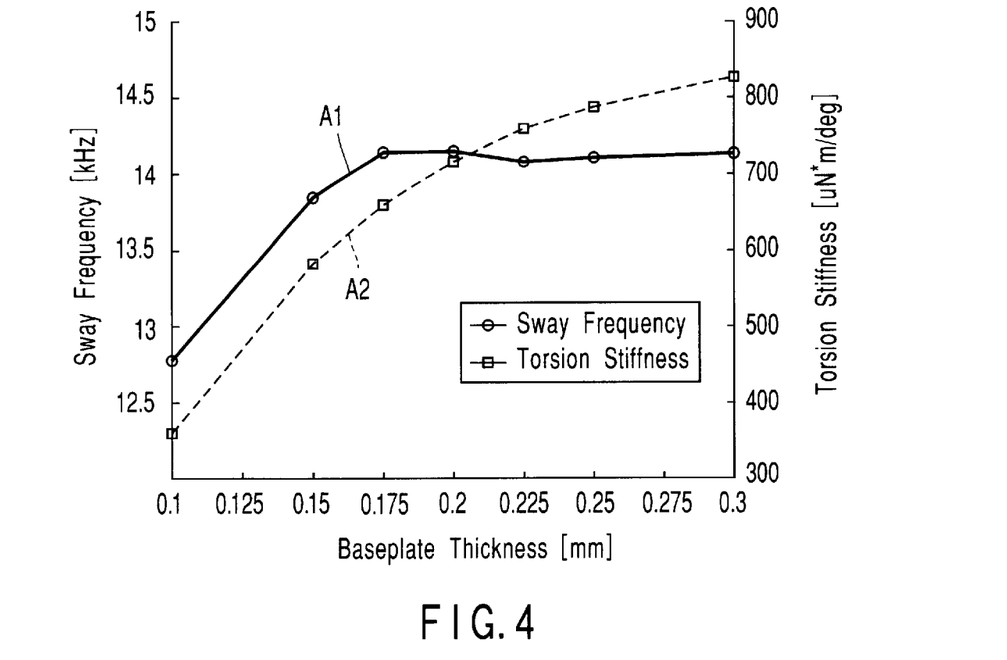
FIG. 4 is a diagram showing the relationship between the thickness of a baseplate and the sway frequency and torsion stiffness of the suspension.

In FIG. 4, A1 represents the relationship between the thickness of the baseplate and the sway frequency of the suspension. The sway frequency is a resonance frequency in the sway direction (direction indicated by arrow S in FIG. 1) of the suspension. In FIG. 4, A2 represents the relationship between the thickness of the baseplate and the torsion stiffness of the suspension. If the thickness of the baseplate is smaller than about 0.17 mm, the sway frequency and the torsion stiffness lower suddenly. If the thickness of the baseplate exceeds 0.25 mm, the baseplate is too heavy to be feasible for practical use. Preferably, therefore, the thickness of the baseplate ranges from 0.17 mm to 0.25 mm.

Figure 5:
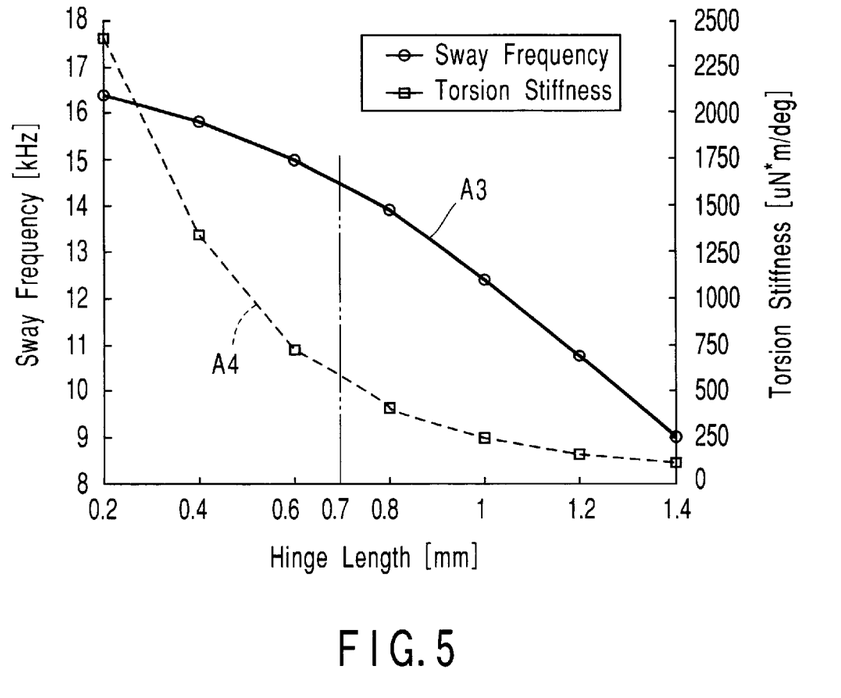
FIG. 5 is a diagram showing the relationship between the hinge length and the sway frequency and torsion stiffness of the suspension.

In FIG. 5, A3 represents the relationship between the hinge length L1 and the sway frequency. In FIG. 5, A4 represents the relationship between the hinge length L1 and the torsion stiffness. If the hinge length L1 exceeds 0.7 mm, as seen from FIG. 5, the torsion stiffness, as well as the sway frequency, lowers considerably. It is to be desired, therefore, that the hinge length should be 0.7 mm or shorter. The shorter the hinge length L1, the higher the sway frequency and the torsion stiffness are. If the hinge length L1 is shorter than 0.1 mm, however, the manufacture of the suspension, adjustment of its performance, etc. are difficult. Accordingly, 0.1 mm is the lower limit of the hinge length L1.

In manufacturing the disc drive, the Z-height inevitably varies owing to limited accuracy of assembly. If the Z-height is subject to variation, the beam portion 3 swings around the spot (e.g., pivot center designated by R1 or R2 in FIG. 3) that is off the distal end 15a of the pivot portion 15. The longer a distance D1 or D2 from the distal end 15a of the pivot portion 15 to the pivot center R1 or R2, the greater the movement of the slider 9 in the direction of arrow F is. Preferably, therefore, the sensitivity to the variation of the Z-height (increasing rate of the distance D1 or D2) should be smaller.

Figure 6:
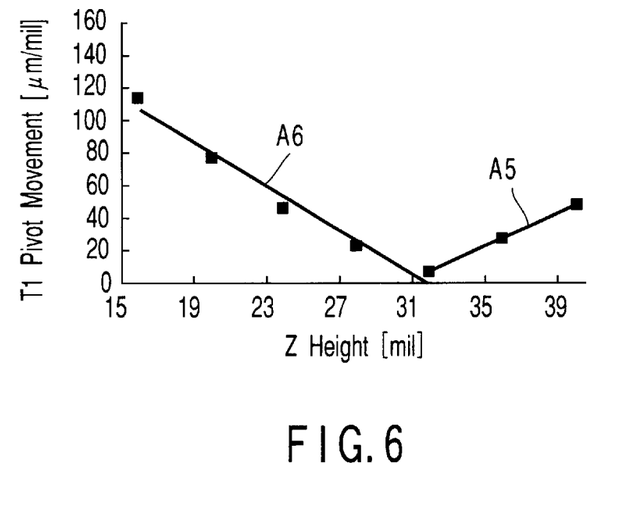
FIG. 6 is a diagram showing the relationship between the Z-height of the suspension shown in FIG. 1 and the displacement of a pivot center.

In FIG. 6, A5 and A6 individually represent results of examination of the degree to which the pivot center is displaced from the distal end 15a of the pivot portion 15 when the Z-height of the suspension is changed. The axis of abscissa of FIG. 6 represents the Z-height, and the unit (1 mil) of the axis of abscissa is equivalent to $1/1,000$ inch or 25.4 $\mu$m. The axis of ordinate of FIG. 6 represents the displacement (displacement in the direction D1 or D2 of FIG. 2) of the pivot center for each mil for the Z-height. The gentler the respective gradients of the segments A5 and A6, the lower the Z-height sensitivity is, and the less easily fluttering is caused.

Figure 7:
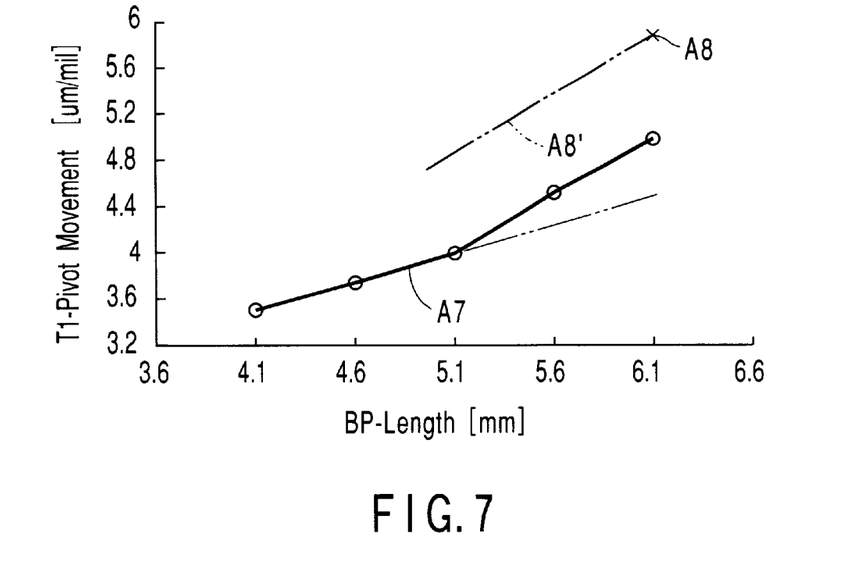
FIG. 7 is a diagram showing the relationship between the baseplate length and the pivot movement.

FIG. 7 shows results of examination of the way the Z-height sensitivity changes when the baseplate length L2 is changed. The axis of ordinate of FIG. 7 represents the movement of the pivot center for each mil for the Z-height.

If the baseplate length is 5.1 mm or shorter, as indicated by a segment A7 in FIG. 7, the movement of the pivot center gently increases at a substantially fixed rate. If the baseplate length exceeds 5.1 mm, however, the movement of the pivot center increases suddenly. Thus, the Z-height sensitivity is suddenly enhanced at an inflection point corresponding to 5.1 mm, and remarkable fluttering develops.

In order to ascertain the reason why the aforesaid inflection point develops, the inventors hereof made diligent studies using a measuring device such as a laser vibrometer. Thereupon, it was revealed that the inflection point develops probably because a vicinity of the hinge portion of the baseplate swings. It was also found that if the length of the baseplate is 5.1 mm or shorter, the whole baseplate functions substantially as a rigid body, so that the Z-height sensitivity can be reduced. For this reason, according to the invention, the baseplate length L2 is restricted within 5.1 mm.

In FIG. 7, A8 represents data on a suspension having a baseplate width W1 of 4.0 mm. The suspension with the baseplate width W1 of 4.0 mm is expected such that the pivot movement changes on high levels if the baseplate is shorter than 6.1 mm, as indicated by a segment A8' in FIG. 7. Therefore, the baseplate width W1 must be made greater than 4.0 mm. If the baseplate width W1 exceeds 5 mm, however, the baseplate is too heavy to be feasible for practical use, so that the upper limit of the baseplate width W1 is adjusted to 5 mm.

Figure 8:
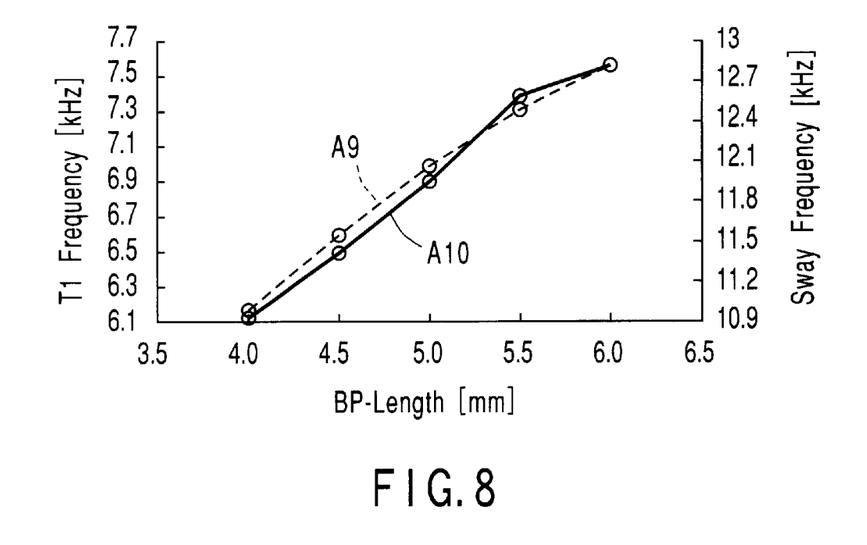
FIG. 8 is a diagram showing the relationship between the baseplate length, first torsion frequency, and sway frequency.

In FIG. 8, A9 represents the relationship between the baseplate length and the resonance frequency for a first torsion mode. In FIG. 8, A10 represents the relationship between the baseplate length and the sway frequency. Preferably, in practice, the first torsion frequency should be 6 kHz or above. According to the invention, therefore, the baseplate length L2 is adjusted to 4.0 mm or longer.

In the case where the distance (suspension length L3) from the center of the boss portion to the pivot portion (dimple) is adjusted to, for example, 14.5 mm, the suspension of the present invention can be made less liable to flutter even with use of a disc that rotates at high speed if the baseplate thickness, baseplate width W1, hinge length L1, and baseplate length L2 are adjusted to 0.2 mm, 4.5 mm, 0.6 mm, and 5.04 mm, respectively. In consideration of fluctuant factors of manufacture, such as tolerance, however, the suspension length L3, baseplate width W1, hinge length L1, and baseplate length L2 may be adjusted to 14.5 mm±0.5 mm, 4.5 mm±0.2 mm, 0.6 mm±0.1 mm, and 5.04 mm±0.06 mm, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIGS. 9 to 11.

Figure 9:
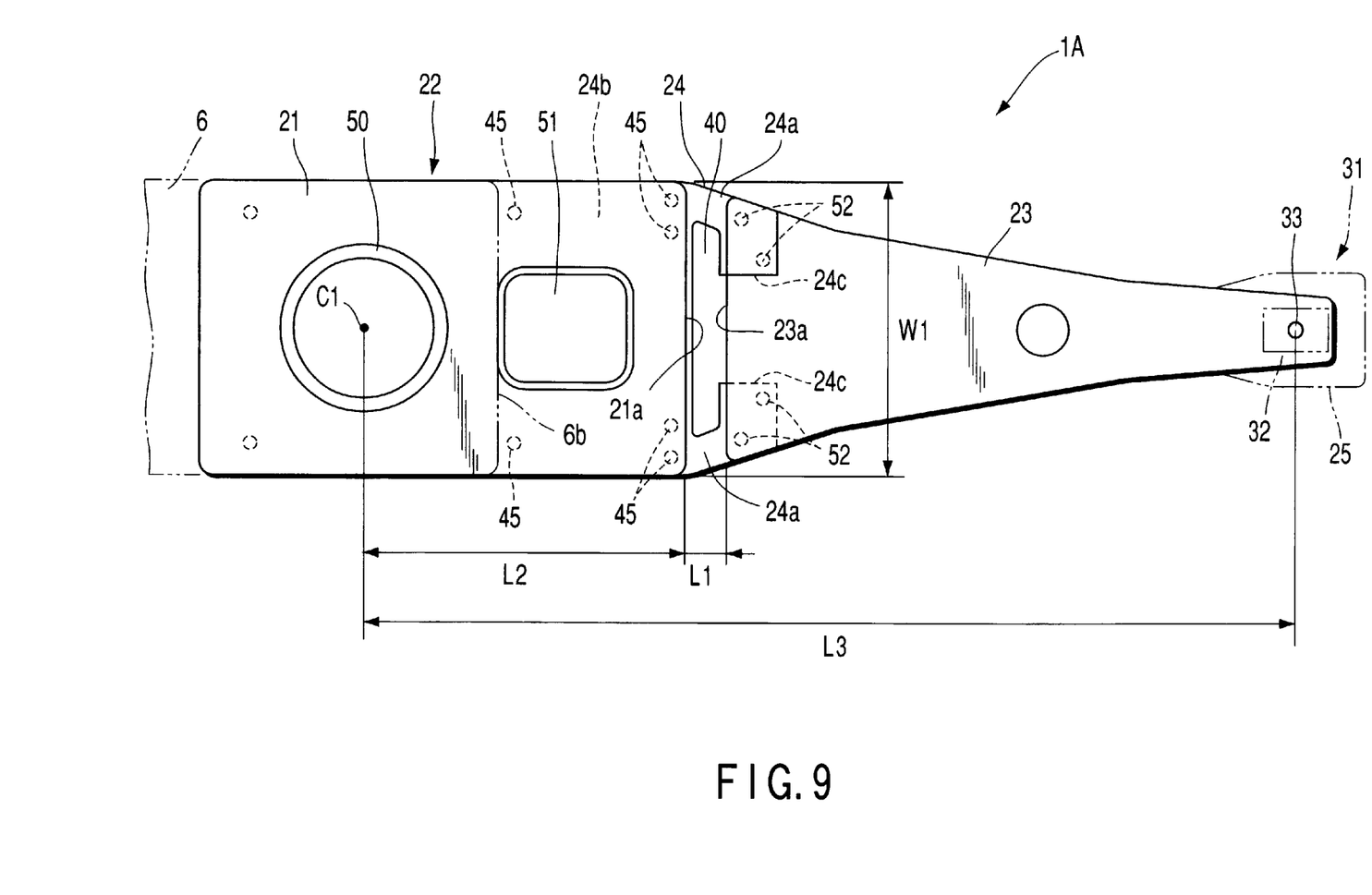
FIG. 9 is a plan view of a suspension for disc drive according to an embodiment of the present invention.

A suspension 1A for disc drive shown in FIG. 9, like the suspension 1 used in the hard disc drive 10 shown in FIG. 2, is fixed to the distal end portion of an actuator arm 6.

The suspension 1A of this embodiment comprises a base portion 22 including a baseplate 21, a beam portion 23, a hinge member 24 connecting the baseplate 21 and the beam portion 23, a flexure 25 on the beam portion 23, etc. For example, the beam portion 23, hinge member 24, and flexure 25 are 100 $\mu m \pm 20$ $\mu m$, 40 $\mu m \pm 10$ $\mu m$, and 20 $\mu m \pm 5$ $\mu m$, respectively, in thickness.

The flexure 25 that is fixed to the beam portion 23 is formed of a plate spring (e.g., rolled stainless steel) that is thinner than the beam portion 23 and the hinge member 24, and is fixed in a given position on the beam portion 23 by laser welding or the like. The flexure 25 is fitted with a slider 32 that constitutes a head portion 31.

A pivot portion (dimple) 33, which is designed to engage the flexure 25, is formed on the distal end portion of the beam portion 23. The pivot portion 33 is situated substantially in the center of the slider 32. The slider 32 can rock integrally with the flexure 25 around the pivot portion 33.

The hinge member 24 is formed of a plate spring member, e.g., a rolled stainless-steel plate, which is thinner than the baseplate 21 and the beam portion 23. An aperture 40 is formed in the hinge member 24. Connecting portions 24a are located on either side of the aperture 40. The connecting portions 24a are bendable in the thickness direction of the hinge member 24. The length of each connecting portion 24a or a hinge length L1 is equivalent to the distance between a front end 21a of the baseplate 21 and a rear end 23a of the beam portion 23.

A proximal portion 24b of the hinge member 24 is fixedly superposed on the baseplate 21 by laser welding or the like. In FIG. 9, numeral 45 denotes a weld. A front end portion 24c of the hinge member 24 is fixed to the beam portion 23 by laser welding or the like. In FIG. 9, numeral 47 denotes an example of a weld. The laser welding may be replaced with an adhesive agent or any other suitable fixing means.

Since the hinge member 24 is constructed independently of the baseplate 21 and the beam portion 23, a spring member of a material and a thickness that meet required properties of the hinge member 24 can be adopted without regard to the baseplate 21 and the beam portion 23. Thus, properties (e.g., high stiffness) that are required of the baseplate 21 and the beam portion 23 can be easily reconciled with properties (e.g., low spring constant) that are required of the hinge member 24.

The baseplate 21 is formed having a boss portion 50 and a hole 51. The boss portion 50 is inserted into a hole in the actuator arm 6. The baseplate 21 is fixed to the actuator arm 6 with an adhesive agent or by subjecting the boss portion 50 to plastic deformation. As shown in FIG. 9, a distal end 6b of the actuator arm 6 is situated between the boss portion 50 and the front end 21a of the baseplate 21.

The following is a description of the dimensions of various parts of the suspension 1A.

A distance L3 (suspension length) from a center C1 of the boss portion 50 to the pivot portion 33 is 14.5 mm, the thickness of the baseplate 21 is 0.2 mm, the hinge length L1 is 0.6 mm, a baseplate length L2 is 5.04 mm, and a width W1 of the baseplate 21 is 4.5 mm. Fluttering of this suspension 1A can be restricted to a practically feasible level for a disc that rotates at a high speed of 15,000 rpm or thereabout.

COMPARATIVE EXAMPLE 1

In a suspension according to Comparative Example 1, the suspension length L3 is 14.5 mm; baseplate thickness, 0.2 mm; hinge length L1, 0.6 mm; baseplate length L2, 6.04 mm; baseplate width W1, 4.0 mm; and hinge member thickness, 40 $\mu m$. This suspension differs from the suspension 1A of the foregoing embodiment in the baseplate length L2 and the baseplate width W1.

COMPARATIVE EXAMPLE 2

In a suspension according to Comparative Example 2, the suspension length L3 is 14.5 mm; baseplate thickness, 0.2 mm; hinge length L1, 0.6 mm; baseplate length L2, 6.04 mm; baseplate width W1, 4.5 mm; and hinge member thickness, 40 $\mu m$. This suspension differs from the suspension 1A of the foregoing embodiment only in the baseplate length L2.

Figure 10:
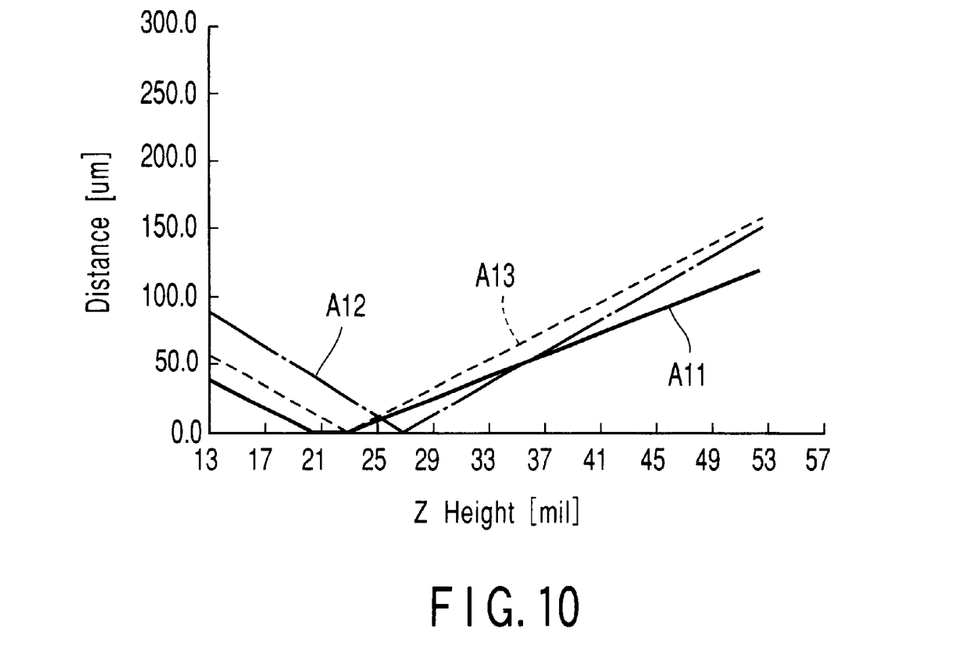
FIG. 10 is diagram showing results of analysis of the relationship between the Z-height and pivot center positions for the suspension shown in FIG. 9 and suspensions according to Comparative Examples 1 and 2.

FIG. 10 shows results of analysis based on the finite element method. This method analyzes the way the pivot center positions for the suspension 1A of the foregoing embodiment and the suspensions according to Comparative Examples 1 and 2 change as the Z-height changes. The axis of ordinate of FIG. 10 represents the distance from the distal end of the pivot portion 33 to the pivot center.

In FIG. 10, A11 represents the Z-height sensitivity of the suspension 1A of the foregoing embodiment. In FIG. 10, A12 represents the Z-height sensitivity of the suspension according to Comparative Example 1, and A13 represents that of the suspension according to Comparative Example 2. As seen from FIG. 10, the suspension 1A of the foregoing embodiment is lower in the Z-height sensitivity than Comparative Examples 1 and 2 and is less liable to flutter if the Z-height varies.

Figure 11:
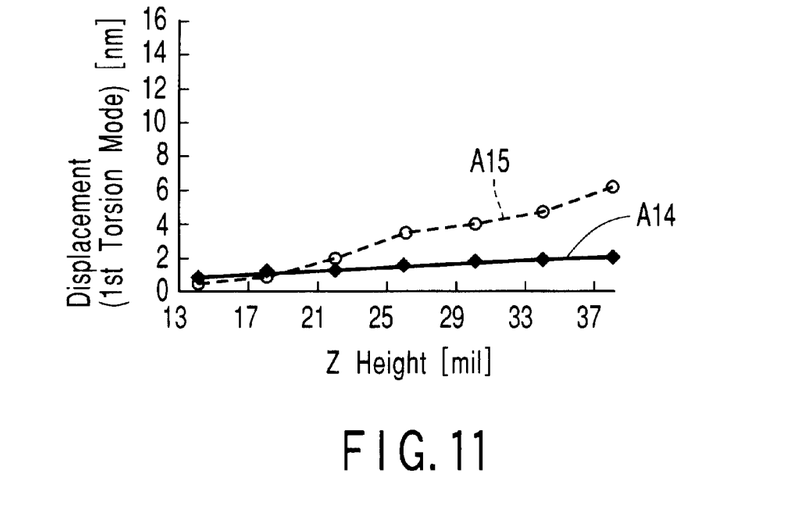
FIG. 11 is a diagram showing results of measurement on the relationship between the Z-height and displacement by fluttering for the suspension shown in FIG. 9 and Comparative Example 2.

FIG. 11 shows results of measurement using laser vibrometer for the suspension 1A of the foregoing embodiment and the suspension according to Comparative Example 2, illustrating the way fluttering is caused as the respective Z-heights of the suspensions are changed. The axis of ordinate of FIG. 11 represents the displacement of the slider. In FIG. 11, A14 represents the Z-height sensitivity of the suspension 1A of the foregoing embodiment, and A15 represents that of the suspension according to Comparative Example 2. It was experimentally confirmed that the segment A14 for the suspension 1A of the foregoing embodiment has a gradient gentler than that of the segment A15 for Comparative Example 2, that is, the Z-height sensitivity of the suspension 1A is lower.

It is to be understood, in carrying out the present invention including the embodiment described herein, that the components of the suspension, including the baseplate, beam portion, hinge member, etc., may be variously changed or modified without departing from the scope or spirit of the invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A suspension for a disc drive, comprising:

a baseplate having a boss portion;

a beam portion; and a hinge member that is formed separately from the baseplate and the beam portion and fixed to the baseplate, said hinge member including a connecting portion bendable in a thickness direction thereof between the baseplate and the beam portion, wherein said hinge member has a thickness less than a thickness of the baseplate and less than a thickness of the beam portion, wherein the thickness of the baseplate ranges from 0.17 mm to 0.25 mm, wherein a width of the baseplate is greater than 4.0 mm and not greater than 5.0 mm, wherein a length of the connecting portion of the hinge member ranges from 0.1 mm to 0.7 mm, and wherein a baseplate length from a center of the boss portion to a front end of the baseplate ranges from 4.0 mm to 5.1 mm.

2. A suspension for a disc drive according to claim 1, wherein a length of said suspension from a pivot portion on a distal end portion of the beam portion to the center of the boss portion is 14.5 mm±0.5 mm, the width of said baseplate is 4.5 mm±0.2 mm, the length of said connecting portion of the hinge member is 0.6 mm 0.1 mm, and said baseplate length is 5.04 mm 0.06 mm.

* * * * *